Aug. 18, 1931.   A. EHNERT   1,819,951
WHEELBARROW
Filed April 17, 1930   2 Sheets-Sheet 1

INVENTOR.
August Ehnert,
BY Geo. L. Kimmel
ATTORNEY.

Aug. 18, 1931.     A. EHNERT     1,819,951
WHEELBARROW
Filed April 17, 1930     2 Sheets-Sheet 2

INVENTOR.
*August Ehnert,*
BY
*Geo. S. Kimmel*
ATTORNEY.

Patented Aug. 18, 1931

1,819,951

UNITED STATES PATENT OFFICE

AUGUST EHNERT, OF KIEL, WISCONSIN

WHEELBARROW

Application filed April 17, 1930. Serial No. 445,161.

This invention relates to wheelbarrows and has for its object to provide, in a manner as hereinafter set forth, an article of such class so constructed and arranged to give a much lower center of gravity to a load than that obtained in wheelbarrows of the type now generally used, whereby the capacity load of the wheelbarrow is much easier to handle.

A further object of the invention is to provide, in a manner as hereinafter set forth, an article of the class referred to including a spring suspension for the scoop, box, receptacle or body portion thereof to materially reduce jar on the operator when pushing the wheelbarrow, when loaded, from point to point, thereby overcoming or reducing to a minimum any discomfiture when handling the work.

Further objects of the invention are to provide, in a manner as hereinafter set forth, a wheelbarrow which is comparatively simple in its construction and arrangement, strong, durable, thoroughly efficient and overcoming discomfiture when used, conveniently handled, readily assembled and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
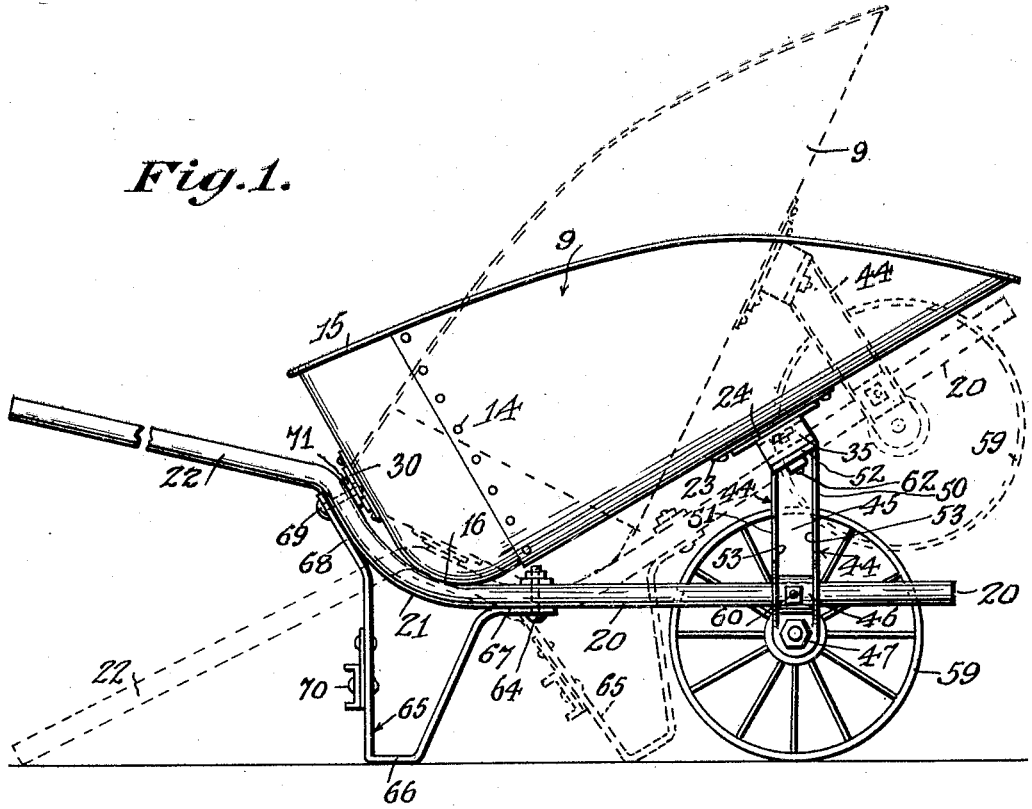
Figure 1 is a side elevation of a wheelbarrow in accordance with this invention, illustrating the same in stationary position in full lines and in dotted lines the wheelbarrow tilted rearwardly from stationary position.
Figure 3:
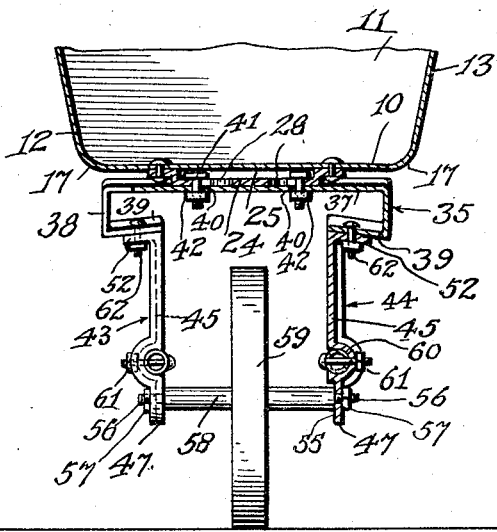
Figure 3 is a fragmentary view in vertical section thereof.
Figure 7:
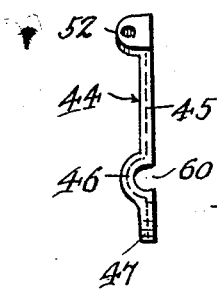
Figure 7 is an elevation looking toward one lengthwise edge of the form of support employed.
Figure 8:
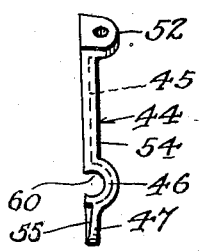
Figure 8 is a view similar to Figure 7 looking toward the other lengthwise edge of the support employed.
Figure 2:
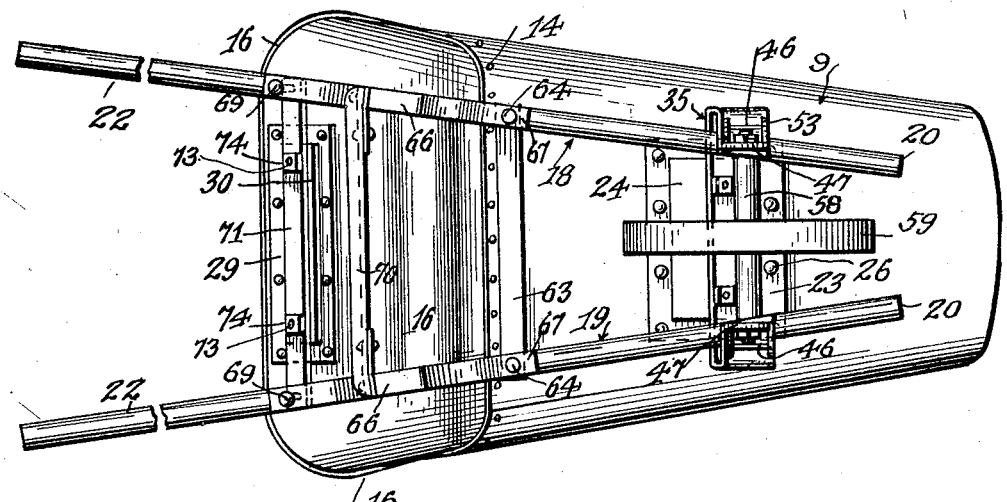
Figure 2 is an inverted plan of the wheelbarrow.
Figure 4:
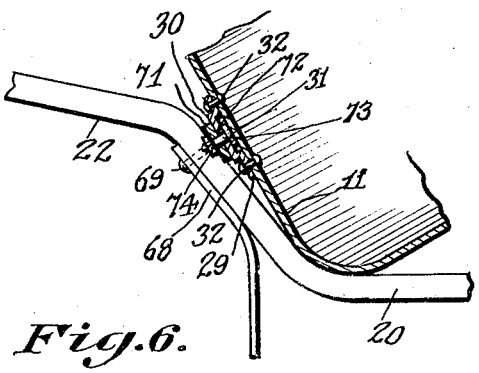
Figure 4 is a fragmentary view partly in longitudinal section and partly in elevation.
Figure 5:
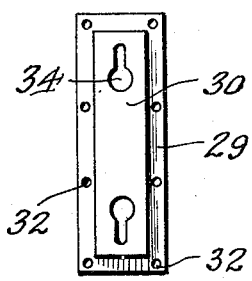
Figure 5 is an elevation of the coupling plate for the handle.
Figure 6:
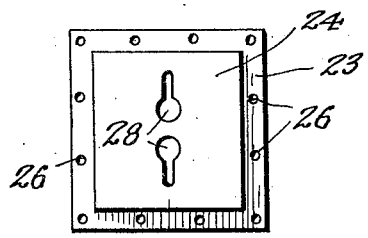
Figure 6 is an elevation of the coupling plate for the spring suspension.

The scoop, box, receptacle or body portion of the wheelbarrow will be hereinafter termed scoop and is generally indicated at 9. The scoop includes a bottom 10, a back 11, and a pair of side walls 12, 13. The scoop 9 is constructed from two sections of sheet metal of the desired gauge. One section provides the back and a portion of the side walls and a portion of the bottom, and the other section provides the remaining portion of the side walls and the remaining portion of the bottom. That section which provides the back and portions of the side walls and bottom is extended into the rear of the other section and fixedly secured therewith by closely arranged rivets 14.

Each side wall extends downwardly upon a curve from the top of the back 11 to the forward end of the bottom 10. The top edge of the scoop 9 is reinforced throughout by a beading 15. The point of joinder of the bottom with the back is rounded as at 16. The points of joinder of the back with the side walls are rounded as at 17. The points of joinder of the bottom with the side walls are rounded as at 17. The side walls extend outwardly with respect to the bottom. The back gradually decreases in width from its top toward its bottom. The bottom gradually decreases in width from its rear to its forward end. The back is inclined at a rearward inclination. By the arrangement set forth the scoop is of somewhat flaring contour. The rounded form at the corners prevents the cement or other material sticking and hardening in the bottom of the scoop or at the corners between the back and the side walls. The rounded formation also facilitates the discharge of the contents of the scoop when desired. The scoop when connected in position with respect to the other elements of the wheelbarrow has its bottom disposed at an angle with respect to the back thereof. The inclination of the back is rearwardly with respect to the inclination of the bottom. This prevents discharge of material when the scoop is elevated on its rear when the operator is transporting material from one point to the other.

The wheelbarrow also includes a pair of opposed, scoop handle bars referred to generally at 18, 19. Preferably the bars are tubular to reduce the weight thereof and are of cylindrical cross section. Each bar comprises a lower or forward longitudinally extending portion 20, an upstanding, curved intermediate portion 21 and an upwardly inclined rear portion 22. The lower end of the intermediate portion 21 merges into the rear end of the lower or forward portion 20. The upper end of the intermediate portion 21 merges into the forward end of the rear portion 22. The portion 20 is of greater length than the portion 21, and the latter supports the curved part at the rear of the bottom of the scoop, such curved part being indicated at 16. The portion 21 also extends to oppose the lower part of the back 10 of the scoop. That part of the portion 21 which opposes the back 11 is spaced from the latter. The portion 22 provides a handle member. The setting up of the scoop relative to the portions 21 of the handle bars gives a much lower center of gravity to the load and whereby the capacity load of the scoop is much easier handled than in the types of wheelbarrows now generally used.

Positioned against the lower face of the bottom 10, between the transverse center of the latter and its forward end is a coupling plate 23 provided with an offset part 24, to form in connection with the bottom 10 a recess 25. The plate 23 is provided with openings 26 for the passage of rivets 27 to fixedly secure the plate to the scoop. The offset part 24 of the plate 23 is formed with a pair of oppositely disposed, aligning, key-hole shaped openings 28 for a purpose to be presently referred to.

Secured to the rear face of the back 11 at a point between the transverse median and upper end is a coupling plate 29, provided with an offset portion 30 to form in connection with the back 11 a recess 31. The plate 29 is also provided with a series of openings 32, for the passage of rivets 33 to fixedly secure the plate to the back 11. The offset part 30 of plate 29 is formed with a pair of oppositely disposed, key-hole shaped openings 34 arranged in alignment with each other, but each opening 34 is arranged between the transverse median and one end of the offset part 30.

Arranged below and of a length to project laterally beyond a pair of opposed sides of plate 23 is a resilient member referred to generally at 35. The member 35 is of a width less than the width of plate 23 and comprises a top 37, a pair of side arms 38 and a pair of inwardly extending, oppositely disposed bottom parts 39 projecting from the lower ends of arms 38. Each bottom part 39 is of a length less than half the length of top 37. A pair of openings 40 is provided in the top 37 and they are spaced a substantial distance from each other. Extending through the openings 40, through the slots 28 and into the recess 25 are headed bolts 41 carrying nuts 42. The key-hole shaped openings 28 enable the positioning of the heads of the bolts within the recess 25. After the heads of the bolts are positioned in the recess 25 the member 35 is shifted laterally so that the shanks of the bolts will extend in the narrow portions of the key-hole shaped openings 28, under such conditions coupling the member 35 with the scoop. The heads of the bolts 41 are square. The nuts 42 are forced against the inner face of the top 37 of member 35 for setting up a clamping action for fixedly securing the member 35 relative to coupling plate 23.

The wheelbarrow also includes a pair of oppositely disposed, upstanding supports which also provide a pair of hangers for the axle of the wheel of the barrow. The supports are generally indicated at 43, 44 and they act to support the member 35 and the latter is also coupled with the tops of the supports 43, 44. As the supports 43, 44 are of like construction, but oppositely disposed, but one support will be described as the description of one will apply to the other. Each support is in the form of a single casting and consists of an upper part 45, a concave intermediate part 46 of a contour greater than a half circle, and a bottom part 47. The side edge 50 of part 45 is of greater length than the side edge 51. The top of part 45 inclines downwardly from side edge 50 to side edge 51. The side edge 50 is the forward side edge of the support. The top of part 45 is formed with an outwardly directed apertured flange 52 which inclines downwardly from front to rear. The parts 45 and 46 are reinforced by flanges 53, 54. The part 47 is apertured and has its inner face 55 bevelled, the bevel extending inwardly on part 47 from its rear side edge to its forward side edge.

The supports 43, 44 incline toward each other and the bevelled surfaces 55 thereof are provided to form faces disposed perpendicular with respect to the perpendicular ends provided on the axle of the wheelbarrow. The axle will be presently referred to.

Extending through the apertures formed in the parts 47 is an axle shaft 56 carrying nuts 57 on its ends for connecting it to the parts 47. Mounted between the supports 43, 44 and having its ends opposing the bevelled inner faces 55 of part 47 is a revoluble axle 58 carrying a wheel 59.

The bars 18, 19 extend toward each other and the portions 20 of said bars extend through the grooves 60 provided by the part 46 of the supports 43, 44. Holdfast devices 61 fixedly secure the portions or parts 20 of the bars 18, 19 of the part 46 to the supports 43, 44. The holdfast devices 61 provide for detachably securing the bars 18, 19 to the supports 43, 44.

The bottom part 39 of the resilient member 35 extends at a downward inclination from front to rear and is seated on the flanges 52 of the supports 43, 44. The inwardly extending parts 39 are detachably secured to the flanges 52 by the holdfast devices 62.

The plate 23, in connection with the member 35 and supports 43, 44 provides a spring suspension for the scoop 9. The member 35 is disposed at an angle with respect to the upper ends of the supports 43, 44 and the position of member 35 is rearwardly at an angle with respect to the plane of the supports 43, 44.

The parts or portions 20 of the bars 18, 19 are spaced from the bottom 10 of the scoop 9 and are connected together by a brace member 63. The member 63 is seated upon the top of the portions or parts 20 of bars 18, 19 and connected therewith by the holdfast devices 64.

The wheelbarrow also includes a rear support which depends from the bars 18, 19 at the parts or portions 21 of such bars. The said rear support includes a pair of vertically disposed substantially V-shaped members 65. Each member 65 has a flat bottom 66. The forward side of each member, at its top has a forwardly directed portion 67 which is positioned against the lower face of the part of portion 20 of a bar 18, 19 and is secured to the latter by the holdfast device 64, the latter being also employed as before stated for connecting the cross brace 63. The rear part of each member has the upper portion thereof directed rearwardly at an upward inclination, as indicated at 68 and is positioned against the part 21 of a bar 18 or 19 and fixedly secured therewith by a holdfast device 69. A cross brace 70 connects the rear portion of one member 65 to the rear portion of the other member 65. Holdfast devices are employed for connecting the ends of the cross brace to the straps.

In proximity to the upper termini of the parts or portions 21 of the bars 18, 19 they are connected together by a cross member 71, which has its ends secured to the bars by the holdfast devices 69. The cross member 71 is disposed in alignment with the lengthwise center of the coupling plate 29. Extending through apertures 72 formed in the cross member 71 and through the key-hole shaped openings 34 are headed bolts 73 carrying on their rear ends clamping nuts 74 which bind against the rear face of the cross member 71. The key-hole shaped openings 34 provide for the entrance of the bolts 73 in the recess 30 and further provide whereby the bolts 73 are coupled with the plate 29 whereby the bars 18, 19 are removably anchored with the back 11 of the scoop 9.

The construction as referred to enables the scoop to be detached from the bars 18, 19 when it becomes damaged and a new one substituted. The same statement applies to the bars 18, 19 when they become damaged. As the tensioning means is also detachably secured in position, it can be removed when occasion requires, and this statement also applies to the supports 43, 44.

It is thought the many advantages of a wheelbarrow, in accordance with this invention, can be readily understood, and although the preferred embodiment of the invention is as illustrated and described, yet it is to be understood that changes in the details of construction can be had which fall within the scope of the invention as claimed.

What I claim is:

1. In a wheelbarrow, a pair of handle bars having the forward portions thereof positioned below the rear portions, a scoop arranged over said forward portions and extending at an upward inclination from rear to front with respect to said forward portions, an apertured element secured against the outer face of the back of the scoop, an apertured element secured against the lower face of the bottom of the scoop, a spring suspension positioned below the bottom of the scoop, means interengaging with said element on the bottom of the scoop for detachably connecting said spring suspension to said bottom, a pair of spaced supports for detachably connecting said spring suspension to the forward portions of said handle bars, and means interengaging with the plate on the back of the scoop for detachably connecting the back of the scoop with said handle bars.

2. In a wheelbarrow, a pair of handle bars having the forward portions thereof positioned below the rear portions, a scoop arranged over said forward portions and extending at an upward inclination from rear to front with respect to said forward portions, an apertured element secured against the outer face of the back of the scope, an apertured element secured against the lower face of the bottom of the scoop, a spring suspension positioned below the bottom of the scoop, means interengaging with said element on the bottom of the scoop for detachably connecting said spring suspension to said bottom, a pair of spaced supports for detachably connecting said spring suspension to the forward portions of said handle bars, means interengaging with the plate on the back of the scoop for detachably connecting the back of the scoop with said handle bars, and a rear support for the scoop depending from and connected to said handle bars intermediate the ends of the latter.

3. In a wheelbarrow, a pair of handle bars having the forward portions thereof positioned below the rear portions, a scoop arranged over said forward portions and extending at an upward inclination from rear to front with respect to said forward portions, an apertured element secured against the outer face of the back of the scoop, an apertured element secured against the lower face of the bottom of the scoop, a spring suspension positioned below the bottom of the scoop, means interengaging with the plate secured to the scoop for detachably connecting said spring suspension to said bottom, a pair of vertical supports for detachably connecting said spring suspension to the forward portions of said handle bars, said supports extending below said forward portions, means interengaging with the plate on the back of the scoop for detachably connecting the back of the scoop with said handle bars, and means for connecting the wheel of the wheelbarrow to said supports below the forward portions of the handle bars.

4. In a wheelbarrow, a pair of handle bars having the forward portions thereof positioned below the rear portions, a scoop arranged over said forward portions and extending at an upward inclination from rear to front with respect to said forward portions, an apertured element secured against the outer face of the back of the scoop, an apertured element secured against the lower face of the bottom of the scoop, a spring suspension positioned below the bottom of the scoop, means interengaging with the plate secured to the scoop for detachably connecting said spring suspension to said bottom, a pair of vertical supports for detachably connecting said spring suspension to the forward portions of said handle bars, said supports extending below said forward portions, means interengaging with the plate on the back of the scoop for detachably connecting the back of the scoop with said handle bars, a rear support for the scoop depending from and connected to said handle bars intermediate the ends of the latter, and means for connecting the wheel of the wheelbarrow to said supports below the forward portions of the handle bars.

5. In a wheelbarrow, a pair of handle bars inclining toward each other, a scoop having rounded corners arranged over the forward portions of said bars, each of said bars intermediate its ends having a depending curved portion, said scoop having the rear part of its bottom seating on said curved portions, interengaging means for detachably connecting the back of the scoop with said curved portions, interengaging means for detachably connecting the bottom of the scoop to the forward portions of said handle bars, said means for connecting the bottom of the scoop to the handle bars including a spring suspension for the scoop, said means provided with apertures for the reception of the axle shaft of the wheel of the wheelbarrow, and a rear support connected with said curved portions.

6. In a wheelbarrow a pair of spaced handle bars inclining toward each other from rear to front, a pair of oppositely disposed, upstanding supports inclining in the same direction as and having said bars extending therethrough, said bars positioned in the supports above the lower ends of the latter, said supports below said bars having the inner faces thereof bevelled, means for connecting the wheel of the wheelbarrow between and with said bevelled parts of said supports, a scoop disposed at an upward inclination from rear to front and having the rear of its bottom seated on said bars intermediate the ends of the latter, means for connecting the bottom of the scoop with said supports, and means for connecting the back of the scoop with said bars.

7. In a wheelbarrow a pair of spaced handle bars inclining toward each other from rear to front, a pair of oppositely disposed, upstanding supports inclining in the same direction as and having said bars extending therethrough, said bars positioned in the supports above the lower ends of the latter, said supports below said bars having the inner faces thereof bevelled, means for connecting the wheel of the barrow between and with said bevelled parts of said supports, a scoop disposed at an upward inclination from rear to front and having the rear of its bottom seated on said bars intermediate the ends of the latter, means for connecting the bottom of the scoop with said supports, means for connecting the back of the scoop with said bars, and a rear support connected to and depending from said bars.

8. In a wheelbarrow, a pair of spaced handle bars inclining toward each other from rear to front, a pair of oppositely disposed, upstanding supports inclining in the same direction as and having said bars extending therethrough, said bars positioned in the supports above the lower ends of the latter, said supports below said bars having the inner faces thereof bevelled, means for connecting the wheel of the barrow between and with said bevelled parts of said supports, a scoop disposed at an upward inclination from rear to front and having the rear of its bottom seated on said bars intermediate the ends of the latter, means for connecting the bottom of the scoop with said supports, said means including a resilient member seated on said supports, and means for connecting the back of the scoop to said bars.

9. In a wheelbarrow, a pair of spaced handle bars inclining toward each other from rear to front, a pair of oppositely disposed, upstanding supports inclining in the same direction as and having said bars extending therethrough, said bars positioned in the supports above the lower ends of the latter, said supports below said bars having the inner faces thereof bevelled, means for connecting the wheel of the barrow between and with said bevelled parts of said supports, a scoop disposed at an upward inclination from rear to front and having the rear of its bottom seated on said bars intermediate the ends of the latter, means for connecting the bottom of the scoop with said supports, said means including a resilient member seated on said supports, means for connecting the back of the scoop to said bars, and a rear support connected to said bars.

10. In a wheelbarrow, a pair of handle bars each including a lower portion, a high, upwardly inclined rear portion and a circular intermediate portion connecting the other portions together, a pair of spaced, aligning vertical supports connected to the forward portions of said handle bars and depending below such forward portions, means for connecting the wheel of the wheelbarrow to said front supports below the forward portions of said handle bars, a scoop disposed over said curved and forward portions, disposed at an upward inclination from rear to front with respect to said forward portions and having the rear part of its bottom seated on said intermediate portions, a spring suspension connected upon said supports, means for connecting said supension to the bottom of the scoop, means for connecting the back of the scoop to the said intermediate portions of the handle bars near the upper ends of said intermediate portions, and a rear support secured to and depending from said intermediate and forward portions.

11. A wheelbarrow including a pair of handle bars formed with upper rear portions, curved depending intermediate portions and lower forward portions, a scoop inclining upwardly from rear to front, said scoop arranged over said forward portions and having a rounded part at its rear seating on the lower ends of said intermediate portions, the back of the scoop and said intermediate portions having interengaging coacting means for detachably connecting the upper portion of the back of the scoop to said intermediate portions, a pair of opposed vertical supports carried by said front portions near the forward ends of the latter, an inclined spring suspension means mounted on and secured to the inclined tops of said supports and disposed transversely with respect to the bottom of the scoop, and interengaging means for detachably connecting the spring suspension to the bottom of the scoop.

12. A wheelbarrow including a pair of handle bars formed with upper rear portions, depending intermediate portions and lower forward portions, a scoop inclining upwardly from rear to front, said scoop arranged over said forward portions, the back of the scoop and said intermediate portions having interengaging coacting means for detachably connecting the scoop to said intermediate portions, a pair of opposed vertical supports carried by said front portions near the forward ends of the latter, a spring suspension means mounted on and secured to said supports and disposed transversely with respect to the bottom of the scoop, interengaging means for detachably connecting the spring suspension to the bottom of the scoop, said supports depending below said forward portions, and means for connecting the wheel of the wheelbarrow to said supports below said forward portions.

13. A wheelbarrow including a pair of handle bars formed with upper rear portions, depending intermediate portions and lower forward portions, a scoop disposed at an inclination from rear to front and arranged over said forward portions and having a rounded part at its rear seating on the lower ends of said intermediate portions, means for connecting the back of the scoop to the upper parts of said intermediate portions, a pair of vertical supports provided in proximity to their lower ends with offset parts to provide grooves for the passage of said forward portions, means for connecting said forward portions to said supports, a rearwardly inclined spring suspension mounted on and secured upon said supports and extending transversely with respect to the bottom of the scoop, and interengaging means for detachably connecting said spring suspension to the bottom of said scoop.

14. A wheelbarrow including a pair of handle bars formed with upper rear portions, depending intermediate portions and lower forward portions, a scoop disposed at an inclination from rear to front and arranged over said forward portions, means for connecting the back of the scoop to said intermediate portions, a pair of vertical supports provided in proximity to their lower ends with offset parts to provide grooves for the passage of said forward portions, means for connecting said forward portions to said supports, a spring suspension mounted on and secured to said supports and extending transversely with respect to the bottom of the scoop, interengaging means for detachably connecting said spring suspension in the bottom of said scoop, and means for connecting the wheel axle of the wheelbarrow to said supports below said grooves.

In testimony whereof, I affix my signature hereto.

AUGUST EHNERT.